United States Patent [19]

Shelly

[11] 4,236,197
[45] Nov. 25, 1980

[54] VOLTAGE REGULATION LOOP FOR INVERTER POWER SUPPLY

[75] Inventor: Randolph D. W. Shelly, Rosemere, Canada

[73] Assignee: Sperry Rand Corporation, New York, N.Y.

[21] Appl. No.: 8,458

[22] Filed: Feb. 1, 1979

[51] Int. Cl.³ .................. H02P 13/20; H02M 1/12
[52] U.S. Cl. .................................. 363/41; 363/95
[58] Field of Search .................................. 363/25-26, 363/41, 133-134, 78-79, 95; 307/265-267

[56] References Cited

U.S. PATENT DOCUMENTS

| | | | |
|---|---|---|---|
| 3,649,902 | 3/1972 | Dunbar | 363/41 |
| 3,701,937 | 10/1972 | Combs | 307/265 X |
| 3,829,716 | 8/1974 | Goyer | 307/265 X |
| 3,859,590 | 1/1975 | Cielo et al. | 307/265 X |
| 4,150,424 | 4/1979 | Nuechterlein | 363/26 |

Primary Examiner—William M. Shoop
Assistant Examiner—P. Wong
Attorney, Agent, or Firm—Kenneth T. Grace; William E. Cleaver; Marshall M. Truex

[57] ABSTRACT

A voltage regulation loop for the rejection of line frequency ripple of 0-180 Hz in an inverter power supply is disclosed. The loop includes an error amplifier (E), a pulse-width modulator (P), an inverter (I), a second summing node ($N_2$), an output filter (F), and a feedback loop back to a first summing node $N_1$ at the error amplifier. The novel pulse-width modulator is non-linearly operated to provide an improved rejection of the power supply's line frequency ripple and an improved stability.

2 Claims, 5 Drawing Figures

DUTY CYCLE:
$$D = \frac{t_{on}}{T}$$

REGULATION:
$$v_o = \frac{t_{on1}}{T} v_{i1} = \frac{t_{on2}}{T} v_{i2}$$

VOLTAGE REGULATION LOOP FOR INVERTER POWER SUPPLY

BACKGROUND OF THE INVENTION

In the prior art it is known to provide regulated DC power to a load using an inverter power supply—see the publication "Power Supplies for Computers and Peripherals," S. Davis, Computer Design, July, 1972, Pages 55-65. Generally, a filtered DC input voltage is converted to a DC signal that is bi-directionally coupled from the center tap to the end terminals of the primary winding of an output or coupling transformer via switching transistors. Control circuitry may be coupled to the secondary winding of the coupling transformer to regulate the output voltage across the load. Additionally, current sensing circuitry on the output side of the coupling transformer may be utilized to provide overload or short circuit protection for variations in loading—see the publication "Here Are More Protective Circuits," A. Annunziato, Electronic Design 10, May 13, 1971, Pages 64-67, with particular reference to FIG. 12. A problem often encountered in inverter power supplies is the coupling of a significant line frequency ripple to the load via the chopping transistor and the inverter's switching transistors. This is because the magnitude of the line frequency ripple that is coupled to the load is directly proportional to the amplitude of the source current which is, in turn, proportional to the duty cycle of the switching transistors. Accordingly, it is desirable that such problem of line frequency ripple coupling to the load be minimized.

SUMMARY OF THE INVENTION

In the voltage regulation loop of the present invention, a fixed, level, constant amplitude reference voltage $v_r$ is, at a first node $N_1$, differentially compared to the power supply's output voltage $v_o$. The difference or error voltage $v_e$, which optimally is zero volts, is coupled to an error amplifier E that, in turn, generates an amplified control voltage $v_c$. Control voltage $v_c$ is, in turn, coupled to a pulse-width modulator P that provides, as an output signal, a duty cycle voltage $v_d$ whose duty cycle D is the ratio of the ON time of the switching elements of the inverter to their total switching period. Duty cycle voltage $v_d$ is coupled to the inverter I to control its duty cycle D and converts the signal level of duty cycle voltage $v_d$ to its power level voltage $v_x$. At a second node $N_2$ the power level voltage $v_x$ and a ripple reference voltage $v_z$, which is representative of the unwanted ripple component in the output signal $v_o$, are added and the resultant inverter voltage $v_i$ is coupled to an output filter F that filters out the switching frequencies (20-50 KHz) of the switching elements, but passes the line frequencies (100-180 Hz) of the power supply and provides as an output thereof the output voltage $v_o$. The present invention is in the design of the pulse-width modulator P in relation to the other elements of the voltage regulation loop, which other elements are conceded to be well-known in the inverter power supply art and are disclosed herein only for the purpose of setting the environment of the pulse-width modulator P of the present invention.

DESCRIPTION OF THE PREFERRED EMBODIMENT

Figure 1:
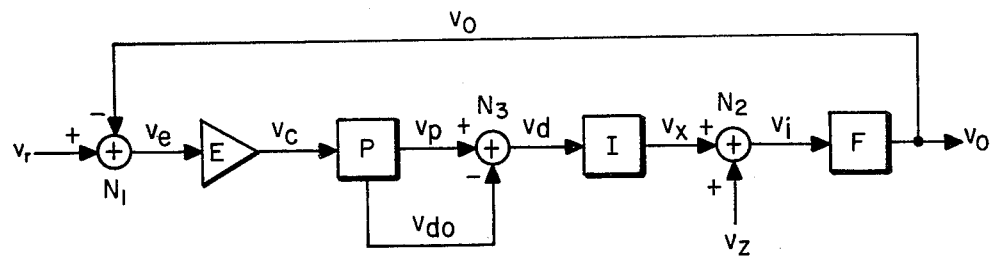
FIG. 1 is a block diagram of the voltage regulation loop in which the pulse-width modulator P of the present invention is incorporated.

With particular reference to FIG. 1 there is presented a block diagram of the voltage regulation loop of the present invention. The purpose of the voltage regulation loop 10 of FIG. 1 is to produce a regulated DC output voltage $v_o$; the illustrated block diagram is applicable to all inverter power supplies. The capability of loop 10 to produce a regulated DC output voltage $v_o$ is a function of the loop's gain and stability for the designed-for range of operating conditions. The frequency range of particular interest is DC to 180 Hz, which is the maximum frequency of rectified AC main power that drives the inverter power supply, and the loop 10 will be analyzed for this frequency range.

Figure 2:
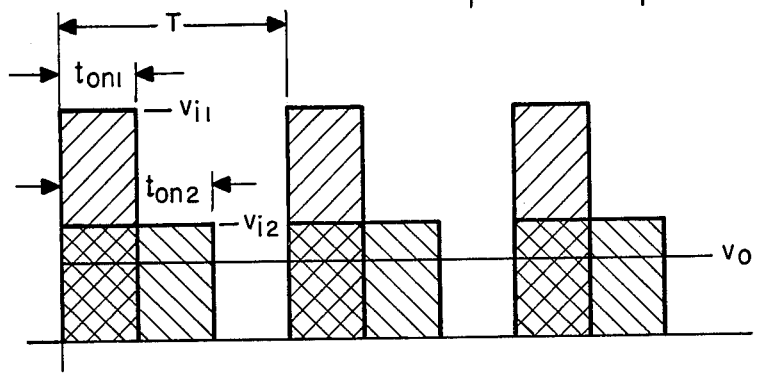
FIG. 2 is a schematic diagram of the constant volt-second area signal from the inverter I that is coupled to the pulse-width modulator P of the voltage regulation loop of FIG. 1.

There are two normal and unavoidable factors which contribute to the non-linear regulation characteristics of inverter power supplies:

The inverter I must operate from a wide range of DC sources, typically a 2:1 ratio. The regulated output voltage $v_o$ of the inverter power supply is regulated by varying the duty cycle D of the inverter's switching transistors to compensate for changes in the DC current from the chopping transistor. The volt-second area presented to the filter F, the principle of which is illustrated in FIG. 2, must be maintained at a constant figure. The gain of inverter I is, as a result of this, non-linear:

$$G_I = \frac{dv_x}{dD} = \frac{k_1}{D}, \qquad \text{Eq. 1}$$

where $k_1$ is a constant, positive real number. The gain $G_I$ of inverter I is therefore a function of the duty cycle D.

The second non-linear factor results from the negative impedance input of the inverter power supply. The line frequency ripple (part of $v_z$) amplitude is directly proportional to the amplitude of the current that is drawn from the main power source. This current is proportional to the duty cycle D, $$v_{z,1} = k_2 D, \qquad \text{Eq. 2}$$

so even if the gain of loop 10 would be constant for all values of D, a larger value of line frequency ripple would appear on the output voltage $v_o$ for a larger value of D.

The present invention provides a means of compensating for both of these non-linearities.

With respect to the block diagram of FIG. 1, summing node $N_1$ is a summing node which adds the signals $v_r$, $v_o$ at its inputs and provides the sum $v_e$ at its output. Summing node $N_1$ is used here in a differential mode, where the feedback voltage $v_o$ is subtracted from the reference voltage $v_r$. In an effective regulation system of loop 10, $v_e$ is maintained close to zero volts implying that the output $v_o$ is tracking the reference $v_r$.

The error amplifier E performs the function of amplification of the error voltage $v_e$ to provide a control voltage $v_c$. The gain and phase shift of error amplifier E is a function of the frequency of the input voltage $v_e$; however, it is assumed for this analysis that the error amplifier E has a constant value A that is non-frequency dependent and that is much larger than unity.

Pulse-width modulator P converts the control voltage $v_c$ to a duty cycle control signal $v_p = v_d + v_{do}$. The design of pulse-width modulator P in relation to the other circuit elements of loop 10 of FIG. 1 is the subject of the present invention. The duty cycle D is the ratio of the ON time of the switching transistors of inverter I to their total switching period.

Inverter I is the element in loop 10 that is controlled by pulse-width modulator P. In an actual application, inverter I converts a DC voltage to a rectangular AC voltage, rectifies the AC voltage to produce a DC voltage with a rectangular AC component. The duty cycle D of the rectangular AC voltage is controlled by the duty cycle D of the pulse-width modulator P. Inverter I is much like a power amplifier, converting the signal level $v_d$ to the power level $v_x$. In the block diagram of FIG. 1, $v_x$ is considered to be only the DC component for the purpose of simplifying the analysis. The AC component is added in at node $N_2$ and is a part of feedback voltage $v_z$. Feedback voltage $v_z$ also includes a component $v_{z,1}$ which is the line frequency (of the AC main power) ripple component on the DC source for the inverter I.

Output filter F is a low-pass filter utilized to filter out frequencies (20–50 KHz) of the switching transistors of inverter I but does not affect main power line frequencies (100–180 Hz). With respect to output filter F, two assumptions are made: (1) output filter F is able to attenuate the AC component from inverter I sufficiently to make it negligible in the loop analysis, and (2) output filter F does not affect the line frequency component of the feedback voltage $v_z$.

It has been shown hereinabove that the subject of the present invention is the design of the pulse-width modulator P, which is utilized to control the operation of the inverter I. It has also been shown that the inverter I control loop and regulation non-linearities are a function of the variable duty cycle D. A primary principle of the present invention is that the pulse-width modulator P may be designed in such a way that its gain $G_p$ is also a function of its duty cycle D, but non-linear in such a way that its non-linearity will compensate for the other non-linearities of loop 10; pulse-width modulator P may be designed to "linearize" the voltage regulation of loop 10.

Figure 3:
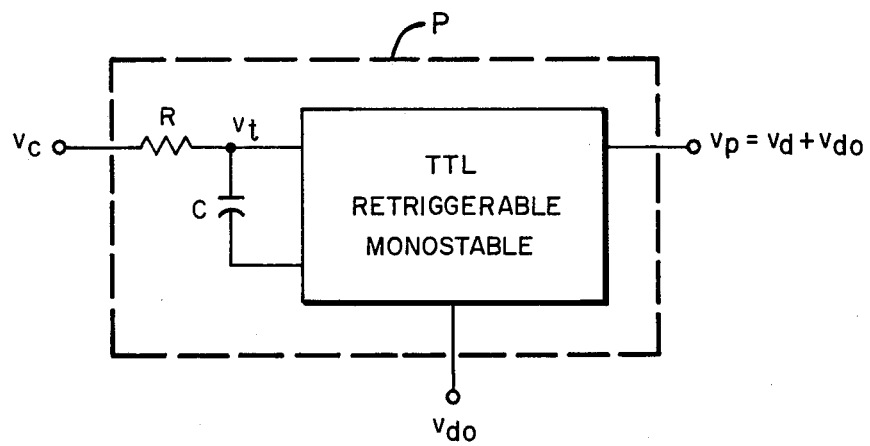
FIG. 3 is a circuit diagram of the pulse-width modulator P of the present invention.

Pulse-width modulator P is designed using the components of FIG. 3 and is defined by the following transfer function equations:

$$TF_p = \frac{dD}{dv_c} = \frac{RC}{T} \frac{v_c - v_2}{v_c - v_1} \left[ \frac{1}{v_c - v_2} - \frac{v_c - v_1}{(v_c - v_2)^2} \right] \quad \text{Eq. 3}$$

where $$v_c = \frac{v_1 - v_2 e^{(D+D_0)\frac{T}{RC}}}{1 - e^{(D+D_0)\frac{T}{RC}}} \quad \text{Eq. 4}$$

These equations illustrate that the value of the gain $G_p$ of pulse-width modulator P decreases with increasing duty cycle D which relationship offsets the effect of inverter I which increases with decreasing duty cycle D and the effect of line frequency ripple which increases with increasing duty cycle D. Pulse-width modulator P has the effect of increasing overall loop gain for increased duty cycle D. The higher gain at an increased pulse-width is required to "regulate-out" the increased line frequency ripple on the output voltage $v_o$. The circuit of loop 10 is a compromise between a constant gain loop which provides optimum stability and a variable loop gain that is proportional to duty cycle D which is optimum from the point of view of rejecting line frequency ripple.

Figure 4:
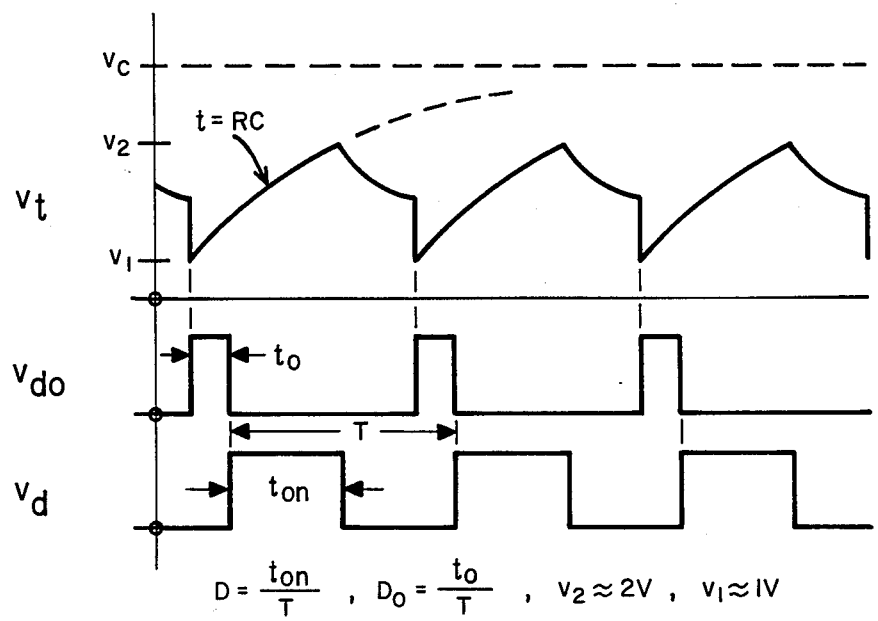
FIG. 4 is a timing diagram of the waveforms of the signals associated with the pulse-width modulator P of FIG. 3.

The circuit design utilized for pulse-width modulator P is an RC network with a TTL re-triggerable monostable; however, any similar circuit may be used which provides a waveform with the rising portion similar to that shown in FIG. 4 as defined by the transfer function $TF_p$ of Equation 3. The ability of the loop 10 to regulate-out a signal such as $v_c$, representing unwanted line frequency ripple in the regulated output voltage $v_o$, is expressed by the value of $$\frac{dv_o}{dv_z} = \frac{F}{I + E \cdot P \cdot I \cdot F}, \quad \text{Eq. 5}$$

where the letters E, P, I, F represent the gain of the respective elements. Smaller values of Equation 5 represent a better capability to reject the unwanted signal $v_z$. Output filter F can be set equal to unity, and the error amplifier E to a constant non-frequency dependent value A for the frequency range of 0–180 Hz. Under these assumptions the above expression reduces to $$\frac{dv_o}{dv_z} = \frac{1}{1 + A \cdot P \cdot I}.$$

Normally, A.P.I is much greater than 1, so the expression can be further reduced to $$\frac{dv_o}{dv_z} = \frac{1}{A \cdot P \cdot I}.$$

Some typical values for pulse-width modulator P and inverter I for typical duty cycle D values of
D = 0.38 minimum and
D = 0.90 maximum
are for
D = 0.90, I = $k_3$, P = $k_4$
and for
D = 0.38, I = 2.38 $k_3$, P = 0.23 $k_4$, so the ability of loop 10 to reject the unwanted feedback signal $v_z$ is $$\frac{dv_o}{dv_z}(D = 0.90) = \frac{1}{A \cdot k_3 k_4}$$

$$\frac{dv_o}{dv_z}(D = 0.38) = \frac{1}{A(2.37k_3)(0.23k_4)} \quad \frac{1}{0.55A \cdot k_3 k_4}.$$

The ability of loop 10 to reject the unwanted signal $v_z$ is therefore $(1/0.55) = 1.82$ times smaller at $D = 0.90$ because $(dv_o/dv_z)$ is 0.55 times smaller at $D = 0.90$. If pulse-width modulator P were a linear pulse-width modulator of the type used in most integrated circuit regulators, the ability to reject the unwanted signal $v_c$ would be $$\frac{1}{2.37} = 0.42$$

as good at $D = 0.90$, because $(dv_o/dv_z)$ would be 2.37 times larger. Accordingly, the degree of improvement provided by loop 10 incorporating the non-linear pulse-width modulator P of the present invention is given by $$\text{improvement} = \frac{2.37}{0.55} = 4.31$$

over prior art conventional circuits.

Figure 5:
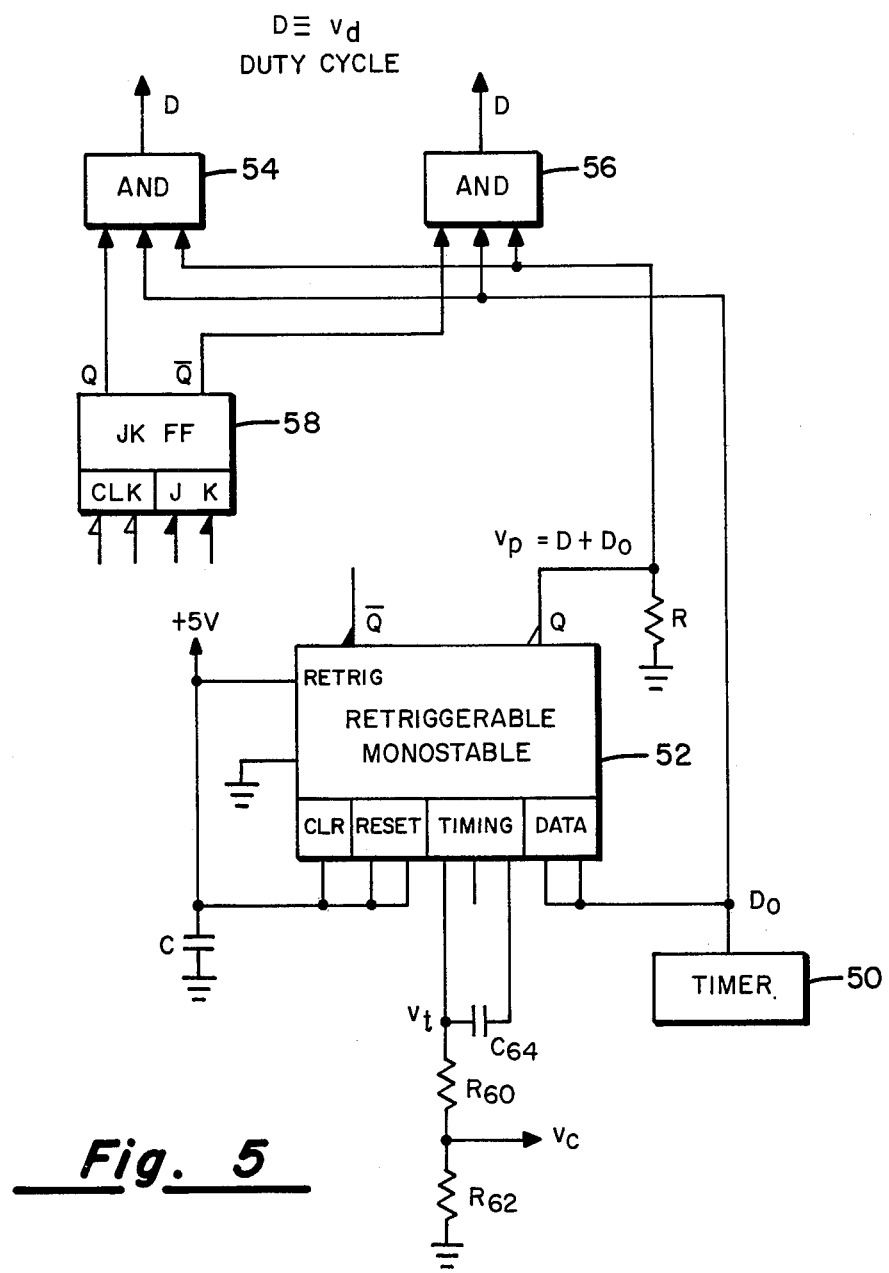
FIG. 5 is a circuit schematic of the preferred embodiment of the pulse-width modulator P of the present invention.

With particular reference to FIG. 5 there is presented a circuit schematic of the preferred embodiment of the pulse-width modulator P of FIG. 3. Timer 50 generates a negative timing pulse $D_o$ having the cycle time T which is coupled to retriggerable monostable device 52 and to three-input AND gates 54 and 56 as first input signals. Retriggerable monostable device 52, having the RC network of resistor $R_{60}$ and capacitor $C_{64}$ at its timing inputs, operates as illustrated in FIG. 4 generating at its output Q the signal $v_p = D + D_o$ which is coupled to AND gates 54 and 56 as second input signals. JK Flip-Flop 58 outputs Q and Q alternatively enable AND gate 54 or 56. The resultant output from either AND gate 54 or 56 is the signal D. See FIG. 4 for an illustrative timing diagram.

What is claimed is:

1. In a voltage regulation loop for an inverter power supply including pulse-width modulator means, the input of which is a control signal $v_c$ that is generated from the power supply's output voltage $v_o$ and the output of which is a duty cycle signal $v_d$ that drives the power supply's inverter, the duty cycle D of said duty cycle signal $v_d$ of which is varied by a variation in the control voltage $v_c$, an improved pulse-width modulator means, comprising:
    timing means for generating a timing signal of cycle time T and of duty cycle $D_0$;
    modulating means coupled to said timing means for generating a modulated output signal of cycle time T and of a variable duty cycle $D + D_0$;
    enabling means for generating alternative first and second enabling signals of cycle time T;
    first and second gating means;
    means coupling said signals of duty cycle $D_0$ and of duty cycle $D + D_0$ to said first and to said second gating means;
    means coupling said first enabling signal to said first gating means;
    means coupling said second enabling signal to said second gating means;
    said first and second enabling signals enabling said first and second gating means to generate respectively alternate pulse modulated output signals of cycle time T and a variable duty cycle D.

2. In a voltage regulation loop for an inverter power supply including pulse-width modulator means, the input of which is a control signal $v_c$ that is generated from the power supply's output voltage $v_o$ and the output of which is a duty cycle signal $v_d$ that drives the power supply's inverter, the duty cycle D of said duty cycle signal $v_d$ of which is varied by a variation in the control voltage $v_c$, an improved pulse-width modulator means, comprising:
    RC network means including a source of a variable amplitude control signal $v_c$;
    timing means for generating a timing signal of cycle time T and of duty cycle $D_0$;
    modulating means coupled to said RC network means and said timing means for generating a modulated output signal of cycle time T and of duty cycle $D + D_0$ that varies in duration in response to said variable amplitude control signal $v_c$;
    enabling means for generating alternative first and second enabling signals of cycle time T;
    first and second gating means;
    means coupling said signals of duty cycles $D_0$ and $D + D_0$ as first and second input signals to both said first and second gating means;
    means coupling said first enabling signal to said first gating means;
    means coupling said second enabling signal to said second gating means;
    said first and second enabling signals enabling said first and second gating means to generate respectively alternate pulse modulated output signals of cycle time T and of duty cycle D.

* * * * *